S. BAXTER.
VEHICLE FENDER.
APPLICATION FILED MAY 3, 1909.

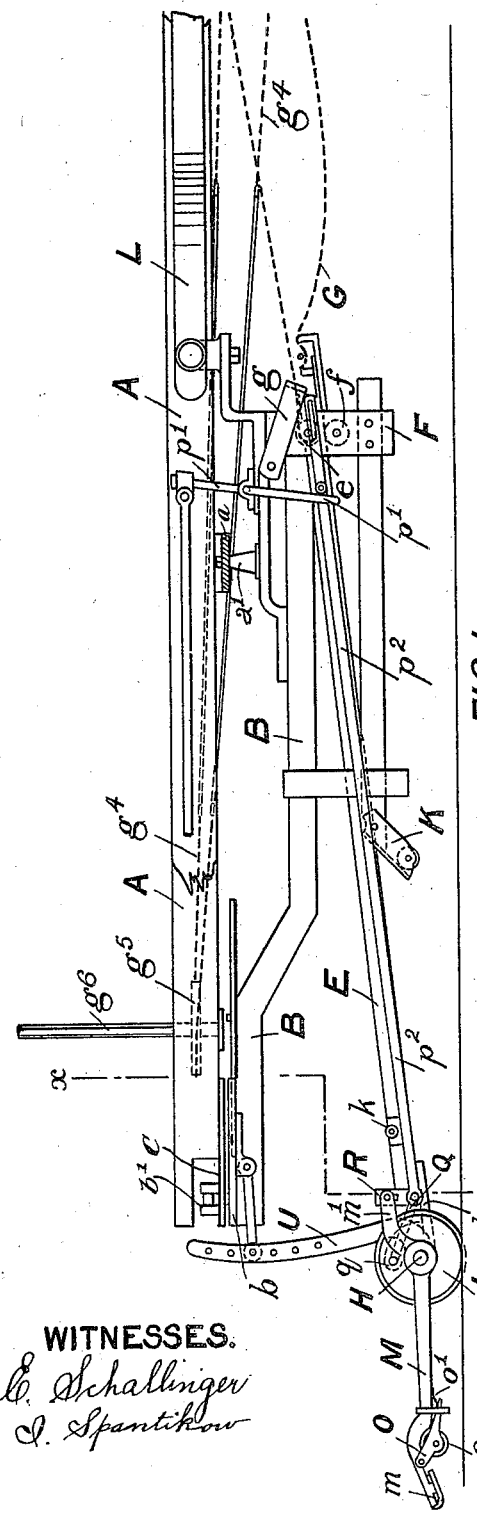
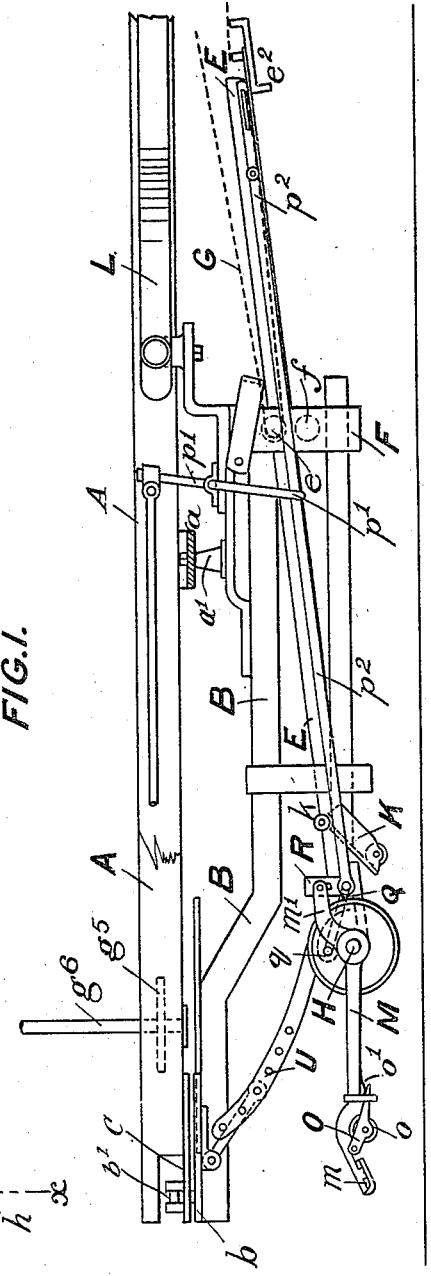

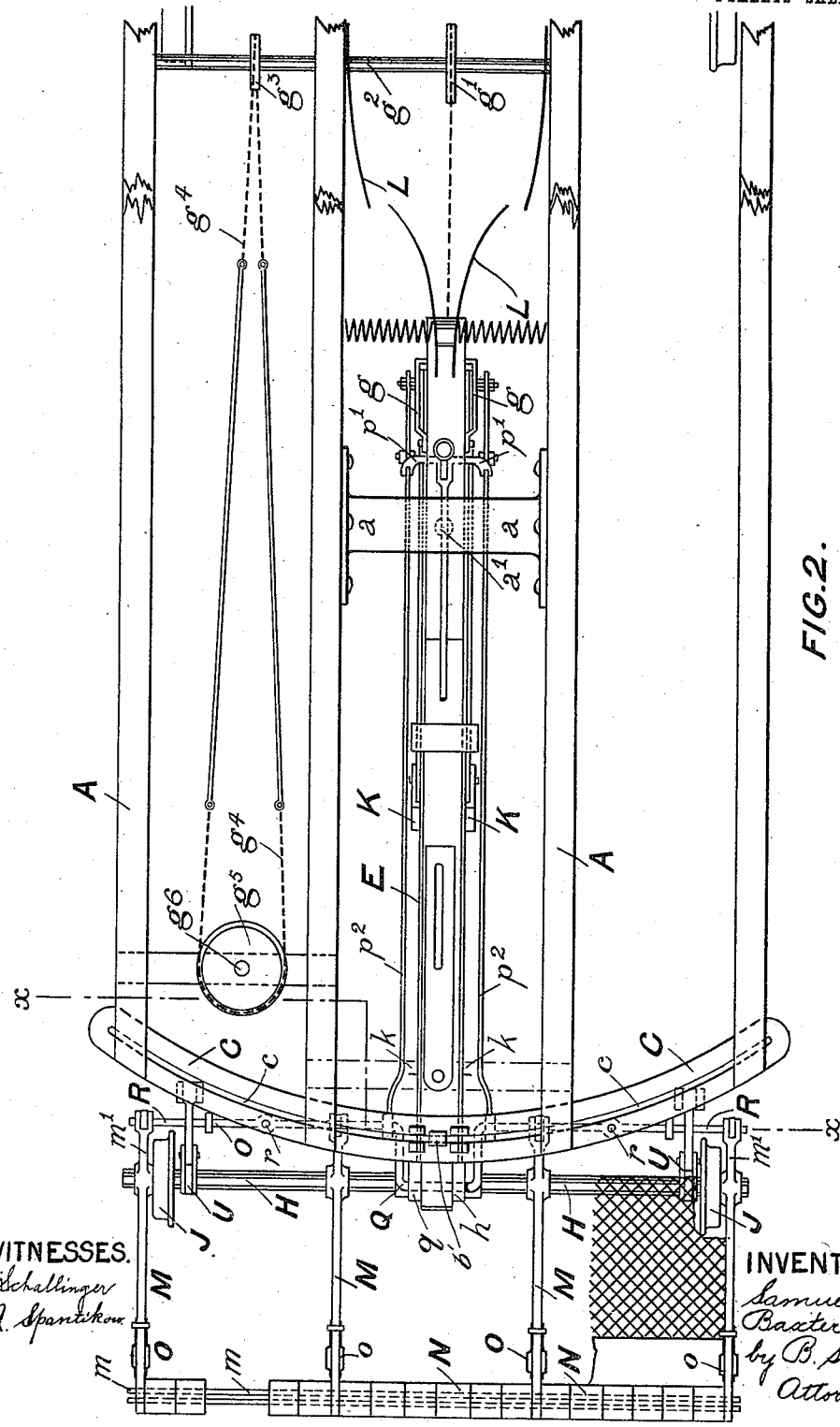

965,272.

Patented July 26, 1910.

4 SHEETS—SHEET 3.

WITNESSES.
E. Schallinger
J. Spantikow

INVENTOR.
Samuel Baxter
by B. Singer
Attorney

S. BAXTER.
VEHICLE FENDER.
APPLICATION FILED MAY 3, 1909.
965,272.
Patented July 26, 1910.
4 SHEETS—SHEET 4.
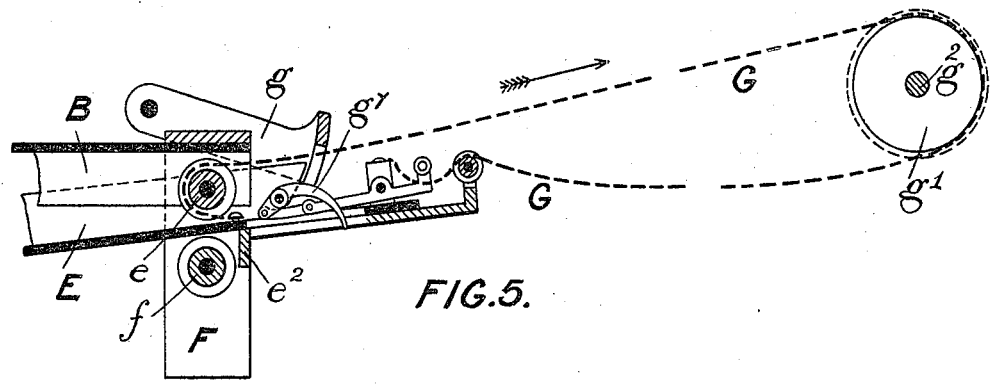
FIG.5.
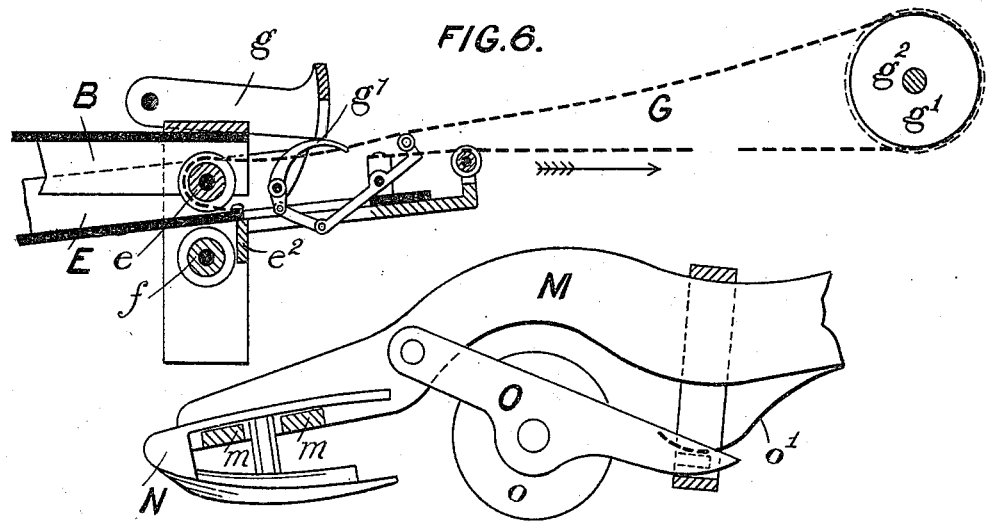
FIG.6.
FIG.7.
FIG.8.
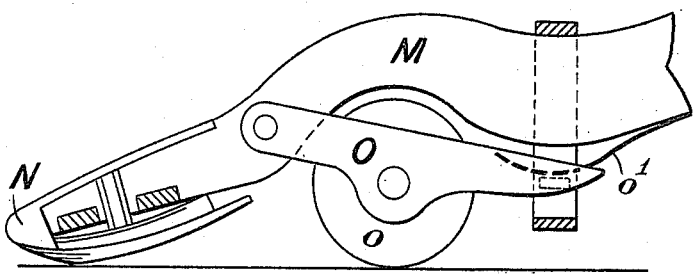
WITNESSES.
INVENTOR.
Samuel Baxter
by B. Singer
Attorney

UNITED STATES PATENT OFFICE.

SAMUEL BAXTER, OF STALEYBRIDGE, ENGLAND.

VEHICLE-FENDER.

965,272.  Specification of Letters Patent.  Patented July 26, 1910.

Application filed May 3, 1909. Serial No. 493,577.

*To all whom it may concern:*

Be it known that I, SAMUEL BAXTER, a British subject, residing at Staleybridge, county of Chester, England, have invented certain new and useful Improvements in Vehicle-Fenders, of which the following is a specification.

This invention relates to improvements in life guards for tram cars, locomotives, motor cars, and other vehicles which are applicable also for other purposes such as snow shifting and the like.

It consists essentially of a guard comprising a catcher or receiver normally supported by and adapted to run on wheels at the front of the vehicle, mounted at the front extremity of supports or bars extending backward under the vehicle, said supports or bars being supported pivotally both vertically and horizontally at the inner end so that the guard can travel around curves and so that swinging of the car and unevennesses of the track are taken up and the lifting of the guard out of the rails is prevented and means for raising the guard from the ground and running or sliding it out of the way under the car, when it is not required.

The invention will be fully described with reference to the accompanying drawings which illustrate the application of the invention to a tram car.

Figure 4:
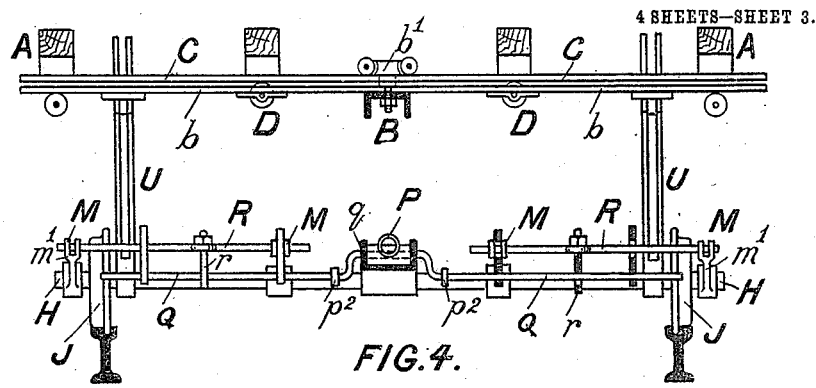
Figure 9:
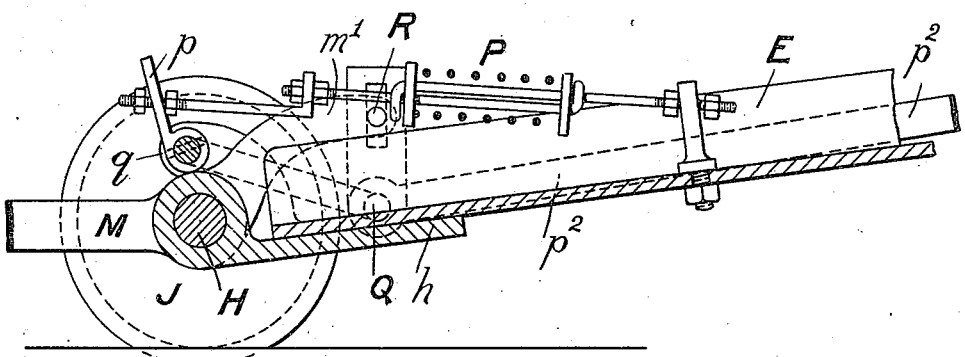

Figure 1. is a side elevation of front of car frame showing the invention applied thereto in the operative position. Fig. 2.
is a sectional plan of same. Fig. 3. is a view similar to Fig. 1. showing the guard drawn under the car. Fig. 4. is a section on line $x$—$x$ Figs. 1 and 2. Figs. 5 and 6 are sectional detail views showing the trigger arrangement for securing the guard in the operative position and releasing same for drawing it in. Figs. 7 and 8. are detail views showing the shoes for lifting any obstruction from the track onto the net or carrier. Fig. 9. is a detail view showing device for maintaining the shoes in normal position, that is, raised from the ground.

Upon a pivot $a'$ mounted in a bracket $a$ underneath the car toward the front of the frame A is mounted or carried a longitudinal support or bar B the forward end of which is constructed with an arcuate portion $b$ which slides against a corresponding arcuate slide or frame C secured underneath the fender of the car. This slide C is preferably formed with a slot $c$ through which a bracket $b'$ attached to the portion $b$ projects. On the bracket are mounted rollers which run on the upper side of the frame or slide C. Rollers D may also be provided to run on the under side of the slide C. The inner end of the bar B is provided with one or more rollers $e$ which preferably enter a groove or channel in a second bar E formed preferably of channel iron or otherwise grooved to receive the said rollers. This second bar E is supported underneath the rollers $e$ by rollers $f$ carried on a suitable bracket F arranged to hold it up against the rollers $e$ on the bar B in such a manner that the lower bar E can be pushed or pulled back between the two sets of rollers. A stop $e^2$ is fixed on the lower bar to prevent it running forward from between the rollers and a catch $g$ operated by a foot lever or like on the fender may be arranged to drop over the end of the bar E to prevent it being pushed back. To extend or withdraw the bar E, and with it the guard, a chain G is employed which passes over one of the rollers $e$, and a chain wheel $g'$ on the shaft $g^2$ and the ends of which are attached to the bar E. The shaft $g^2$ is operated from the fender by any suitable means such as a hand wheel operating as shown through the upright shaft $g^6$ the chain wheel $g^5$ the chain $g^4$ and the second chain wheel $g^3$ on the shaft $g^2$. The chain G is preferably of such a length that there is a certain amount of slack allowed so that when the hand wheel is operated to draw in the guard the tightening of the chain operates a trigger device $g^7$ to lift the catch $g$ and release the bar E.

The lower end of the bar E carries a bracket or bearing $h$ in which a cross rod or shaft H is mounted which carries small wheels J which, where the vehicle runs on rails, run in or on the said rails, and support the lower end of the said bar E. When the vehicle runs around a curve it will be seen that the flanges of bar E engaging the flanges of bar B cause the latter to rotate around the pivot $a'$ underneath the car and the slide $b$ at the front of the bar B slides around under the corresponding slide C. The lower bar E being thus supported at the upper end between rollers $e$ and $f$ and at the lower on the wheels J it will be seen that no matter how the car swings or rises and falls on its springs the wheels J are never lifted from the rails, owing to the free pivotal action of the bars B and E. The shaft H is preferably connected to the slide $b$ by links U. A second bracket with a runner normally a short distance below the lower bar E is mounted somewhere about the middle of the bar to support it when it is pushed back, or as shown in the drawings an inclined cam device or track K adapted to engage the roller $k$ on the bar E and raise the guard from the ground when it is drawn back may be employed.

Spiral and bar or plate springs L may be provided at both sides of the frame to maintain it in the normal position in line with the car, and also to bring it back to normal should the wheels J get out of or off the rails. Where the vehicle does not run on rails these springs may be made stronger.

Upon the same shaft H as the wheels J are pivoted two or more levers M (four are shown in the drawing) which project forward some distance, the front ends of which are connected together by one or more cross rods $m$ upon which are mounted loosely, side by side, so as to have play thereon, that is so that they can normally lift slightly independently of each other, a number of small shoes N (see Figs. 7 and 8.) These shoes N are normally carried by the supports $m$ by means to be described below, at about three inches above the level of the ground. Near the front of each lever M upon a bracket O pivoted to the lever and pressed downward by a spring $o'$ are mounted small wheels $o$ so arranged that when the levers M drop or are forced down they touch the ground before the shoes N but as the pressure is increased the springs are overcome, the wheels $o$ are pressed up to the levers M and the shoes N are pressed down on to the ground. When the levers are forced down the cross supports $m$ in the shoes N are so arranged as to press against the bottom of the shoes and force their points to the ground instead of the shoes N hanging as normally upon the supports $m$. The ends of the levers M are preferably formed with shoes arranged to rise out of any holes in the ground they may be forced into. The inner ends $m'$ of the levers M which project (see Fig. 9), beyond the shaft H on which they are pivoted are forced downward by a spring P in such a manner as to maintain the shoes a short distance above the ground. The spring P is preferably made adjustable so as to regulate the distance the front of the levers M and the shoes N are raised above the ground. One end of the spring P is attached to the bar E and the other is attached to one end of a suitable bell crank lever $p$ or other connection. The pressure of a foot lever on the fender by means of the lever $p'$ and link $p^2$ overcomes the force of the spring P and forces the forward ends of the levers M with the shoes N down on to the ground. This latter is accomplished as follows. The lower end of the link $p^2$ engages the cranked cross bar Q which is pivoted in the bearing $q$ in such a manner that when the link $p^2$ is pulled the cross bar Q is raised. This cross bar carries at either side one or more short uprights $r$ which engage rods R connecting the inner ends $m'$ of the levers M carrying the shoes. The connections are preferably made so as to allow play in the joints to enable the shoes to take any unevenness of the road and yet remain in contact therewith.

One of the features of the invention is that all the connections and joints are made with play to allow perfect elasticity and freedom of the parts.

The levers M are covered in any suitable manner with a flooring plate net or the like to receive anything picked up by the apparatus. As shown a sheet iron covering is provided to cover the ends of the levers and the remainder of the space over the levers is covered with netting. The levers M and the tray can be folded up on their pivotal shaft H if it is desired to lift them out of the way. Or the whole device with the lower stay E can be pushed or pulled back under the car and rest on the brackets above described. Similar apparatus can be applied to both ends of a car or other vehicle and they may be connected together so that when one is pushed in, the other is pushed out. For this purpose a rack may be formed on the connecting bar or rod which is operated by a pinion. If desired a cranked portion may be formed in the connecting bar or rod so that both ends may be drawn in at the same time. The arrangement is very flexible and engages any obstacle with a certain amount of elasticity so that sharp concussions are prevented. Any additional stays desirable may be provided.

What I claim as my invention and desire to protect by Letters Patent is:—

1. In combination, a vehicle, a fender therefor, wheels supporting said fender, a bar connected with said fender and extending rearwardly beneath the front end of the vehicle, a pivotal mounting suspending the rear end of said bar and permitting horizontal play of the fender and bar, and a roller supporting the bar and permitting vertical and longitudinal movement thereof.

2. In combination, a vehicle, a fender therefor, wheels supporting said fender, a bar connected with said fender and extending rearwardly and beneath the front end of the vehicle, a pivotal mounting having a vertical axis and suspending the rear end of said bar and permitting horizontal play of the fender and bar, and a roller having a horizontal axis for supporting the inner end of said bar and permitting vertical and longitudinal movement thereof.

3. In combination, a vehicle, a fender therefor, wheels supporting said fender, a bar connected with said fender and extending rearwardly and beneath the front end of said vehicle, a trigger or catch for locking said bar in a forward position, a roller supporting said bar and permitting vertical and longitudinal movement thereof, means for retracting said bar, and a trip device actuated by said means for releasing engagement between said catch and bar to permit retraction of the latter.

4. In combination, a vehicle, a fender therefor, wheels supporting said fender, a bar connected with said fender and extending rearwardly beneath the front end of said vehicle, a roller supporting the rear end of said bar and permitting vertical and longitudinal movement thereof, a stop on said bar engaging said rollers to limit forward movement of said bar, a catch engaging the rear end of said bar to lock the same against rearward movement, means for drawing said bar rearwardly, and a trip device actuated by said means for releasing engagement between said bar and catch to permit retraction of the bar.

5. In combination, a vehicle, a fender therefor, wheels supporting said fender, a bar connected with said fender and extending rearwardly beneath the front end of the vehicle, a support for the rear end of said bar permitting longitudinal movement thereof, means for retracting said bar to withdraw the fender from an operative position, and a cam device for automatically raising said fender when the same is withdrawn from an operative position.

6. In combination, a vehicle provided with an arcuate member at its front end, a supporting bar having its front end slidably mounted on said member, a pivotal mounting for the rear end of said bar having a vertical axis and permitting horizontal movement of said main bar, a fender for the vehicle, a fender bar extending rearwardly from the fender beneath the vehicle, a support on said main bar for slidably supporting said fender bar, means connected with said fender bar for retracting said fender, and a cam track for automatically raising said fender bar when the same is retracted.

7. In combination, a vehicle provided with an arcuate member, a main supporting bar having its front end slidably mounted on said member, a pivotal mounting for the rear end of said supporting bar permitting movement of the front end thereof horizontally, a fender for the vehicle, a fender bar connected with said fender and extending rearwardly beneath the front end of the vehicle and beneath said main supporting bar, a roller carried by said main bar for slidably supporting said fender bar and permitting vertical movement of said fender bar thereon, and means for retracting said fender bar to retract said fender from the front end of said vehicle.

8. In combination, a vehicle provided with an arcuate member, a main supporting bar having its front end slidably mounted on said member, a pivotal mounting for the rear end of said supporting bar, a fender, a link connection between said fender and said supporting bar, a fender bar extending rearwardly from said fender beneath said supporting bar, a roller mounting for said fender bar supported from said main bar, and means for retracting said fender bar and fender from the front end of said vehicle.

9. In combination, a vehicle, a fender for said vehicle, a main bar extending rearwardly from the front end of said vehicle and beneath the same, a fender bar extending from said fender rearwardly, a support on said main bar holding said fender bar in longitudinal sliding engagement therewith, and means for retracting said fender bar to withdraw the fender from the front end of the vehicle.

10. In combination, a vehicle, a main supporting bar pivotally suspended from said vehicle and having its front end slidably mounted thereon to swing horizontally, a fender for said vehicle, links connecting said fender with said main bar to cause the same to swing horizontally with said fender, a fender bar extending rearwardly from said fender, a support on said main bar for holding said fender bar in longitudinal sliding engagement with said main bar, and means for retracting said main bar to withdraw said fender from the front end of the vehicle.

11. In combination, a vehicle, a main bar slidably mounted at its front end on said vehicle to swing horizontally, a pivotal mounting for the rear end of said bar, a fender for said vehicle, means for connecting said fender with the front end of the main bar to cause the same to swing horizontally in unison, a fender bar extending rearwardly from said fender, a roller support on said main bar holding said fender bar in longitudinal sliding engagement with said main bar and permitting longitudinal and horizontal movement of said fender bar, and means for retracting said fender bar.

12. In combination, a vehicle, a fender therefor, means supporting the forward portion of the fender out of contact with the ground surface, a plurality of shoes loosely mounted on the forward portion of said fender, wheels mounted near the front portion of said fender, springs normally maintaining said wheels in position to engage the ground surface prior to engagement thereof by said shoes, and serving to permit relative movement of said wheels with respect to said fender to effect engagement between said shoes and said ground surface.

13. In combination, a vehicle, a fender therefor, means supporting the forward portion of the fender out of contact with the ground surface, a plurality of shoes loosely mounted on the forward portion of said fender, wheels mounted on said fender near said shoes, and springs acting to force said wheels downwardly to engage the wheels with the ground surface prior to engagement thereof by said shoes and yielding to permit relative movement of said wheels with respect to said fender to effect engagement between said shoes and the ground surface.

14. In combination, a vehicle, a fender therefor, means supporting the forward portion of the fender out of contact with the ground surface, a plurality of shoes loosely mounted on the forward portion of said fender, wheels near the forward portion of said fender, frames pivoted to said fender and supporting said wheels, and springs engaging said frames to maintain said wheels in a position to engage the ground surface prior to said shoes.

15. In combination, a vehicle, a fender therefor provided on its forward portion with a plurality of bars, shoes having upper and lower parts extending above and below said bars, respectively, and vertical portions connecting said upper and lower portions and extending between said bars.

16. In combination, a vehicle, a fender therefor provided on its forward portion with bars, and shoes provided with portions extending between said bars for loosely connecting said shoes with said fender.

17. In combination, a vehicle, a fender therefor, means connecting said fender with said vehicle, wheels for supporting the rear end of said fender, a plurality of loosely mounted shoes on the front edge of said fender, an adjustable spring device for normally tilting said fender to raise said shoes out of engagement with the ground surface, and means acting through said spring device for tilting said fender to lower the front edge thereof and bring said shoes into engagement with the ground surface.

18. In combination, a vehicle, a fender therefor, means connecting said fender with said vehicle, wheels for supporting the rear end of said fender, a plurality of loosely mounted shoes on the front edge of said fender, wheels mounted on said fender near the front edge thereof, springs normally maintaining said front wheels in a position to engage the ground surface prior to engagement thereof by said shoes and serving to permit relative movement of said wheels with respect to said fenders to effect engagement between said shoes and said ground surface.

19. In combination, a vehicle, a fender therefor, a rigid non-extensible bar connected with said fender and extending rearwardly from the front end and beneath the vehicle, devices located beneath and rearwardly from the front end of the vehicle for suspending the rear end of said bar and permitting horizontal movement of the fender and bar and longitudinal movement of the bar, and means for moving said bar longitudinally to retract said fender from the front end of the vehicle.

20. In combination, a vehicle, a fender therefor, a rigid non-extensible bar connected with said fender and extending rearwardly from the front end and beneath the vehicle, devices having angularly disposed axes and located beneath and rearwardly from the front end of the vehicle for suspending the rear end of said bar and permitting horizontal movement of the fender and bar and longitudinal movement of the bar, and means connected with the bar for retracting the same and fender from the front end of the vehicle.

21. In combination, a vehicle, a fender therefor, a bar connected with said fender and extending rearwardly beneath the front end of the vehicle, a device for supporting the rear end of said bar and permitting longitudinal movement thereof, a trigger or catch for locking said bar in a forward position, means for retracting said bar, and a trip device for releasing engagement between said catch and bar to permit retraction of the latter.

22. In combination, a vehicle, a fender therefor, a main bar connected with the fender, and pivotally mounted beneath said vehicle to permit lateral movement of the forward end of said bar, and a fender bar connected with said fender and suspended from said main bar.

23. In combination, a vehicle, a fender therefor, a main bar, means mounting said main bar beneath said vehicle and permitting lateral movement of said main bar and preventing longitudinal movement thereof, a fender bar connected with said fender, and means suspended from said main bar for permitting lateral movement of said fender bar and fender and longitudinal movement of said fender bar.

24. In combination, a vehicle, a fender therefor, flanged main and fender bars, one of which is connected with the fender, and means for supporting said bars beneath the vehicle and maintaining the flanges of said bars in engagement and permitting longitudinal movement of one of said bars with respect to the other.

In testimony whereof I have hereunto set my hand in presence of two subscribing witnesses.

SAMUEL BAXTER.

Witnesses:
   I. OWDEN O'BRIEN,
   HARRY BARNFATHER.